United States Patent Office 3,431,125
Patented Mar. 4, 1969

3,431,125
SYNTHETIC GEMSTONES
John Gordy, 1011 Dennis Crescent E., Richmond,
British Columbia, Canada
No Drawing. Filed July 12, 1965, Ser. No. 471,417
U.S. Cl. 106—42      4 Claims
Int. Cl. C04b *35/08, 35/14, 35/46*

ABSTRACT OF THE DISCLOSURE

Synthetic gem-like crystals which possess substantially the following molecular formula ratio:

| | Moles |
|---|---|
| XO | 0.893 |
| $M_2O_3$ | 0.083 |
| $ZO_2$ | 1.100 |

In the above formula XO represents a metal oxide wherein X is a divalent ion such as calcium, beryllium, magnesium or barium; $M_2O_3$ is a metal oxide wherein M is a trivalent metal ion selected from the group consisting of aluminium, chromium, iron, manganese, nickel and mixtures thereof; and $ZO_2$ represents a metal oxide of a tetravalent compound such as silicon, titanium and germanium. The aforesaid gem-like crystals are made by:

(1) Combining XO, $M_2O_3$ and $ZO_2$ (or equivalents thereof) in the ratio given above;
(2) Heating the mixture to above its flux point of about 1100 to 1200° C.; and
(3) Cooling the flux to obtain the desired crystals.

---

The present invention relates to novel man-made gem-like crystalline materials, and more specifically, to a unique synthetic crystalline material which possesses a high degree of brilliance and hardness.

It is generally known that inexpensive materials such as calcium oxide (CaO) and silicon dioxide ($SiO_2$) may be combined at high temperatures to produce fairly hard crystalline materials. Typical among such materials are the synthetic garnets which possess a Mohs hardness of about 4 to 7 and an index of refraction of about 1.3 to 1.7. These prior art CaO-$SiO_2$ based materials have found utility as economical abrasive and decorative materials where a particularly high degree of hardness or brilliance is not required. It has been, however, the aim of prior art workers to produce a synthetic crystalline material which is based on economic raw materials, such as is garnet, but which possesses a higher degree of hardness and brilliance.

It is, therefore, an object of the present invention to provide a novel synthetic crystalline material which possesses a high degree of gem-like brilliance from inexpensive raw materials.

It is another object to provide an economical, yet extremely hard abrasive material from readily available raw materials.

It is a further object to provide a novel method by which novel synthetic gem quality stones having substantial size and a high degree of brilliance may be readily prepared from a melt of inexpensive compounds.

These and still further objects of the present invention will become readily apparent to one skilled in the art from the following detailed description and specific examples.

Broadly, my present invention contemplates novel synthetic gem-like crystals which possess the following molecular formula ratio:

| | Moles |
|---|---|
| XO | 0.893 |
| $M_2O_3$ | 0.083 |
| $ZO_2$ | 1.100 |

In the above formula XO represents a metal oxide wherein X is a divalent ion such as calcium, beryllium, magnesium or barium; $M_2O_3$ is a metal oxide wherein M is a trivalent metal ion selected from the group consisting of aluminum, chromium, iron, manganese, nickel and rare earth metal ions with atomic number from 58 to 71 and mixtures thereof; and $ZO_2$ represents a metal oxide of a tetravalent compound such as silicon, titanium and germanium.

More specifically, I have found that a unique and extremely useful gemstone may be obtained which possesses a hardness of about 8.5 on the Mohs scale and a refractive index of about 1.9 by the following procedure:

(1) Combining XO, $M_2O_3$ and $ZO_2$ (or equivalents thereto) in the ratio given above;
(2) Heating the mixture to above its flux point of about 100 to 1200° C.; and
(3) Cooling the flux to obtain the desired crystals.

The crystals prepared by the present process possess a unique interstitial or superlatice structure not found in any prior art synthetic or naturally occurring crystalline compound. The hardness and index of refraction of the present crystals is considerably greater than the garnets which also contain CaO and $SiO_2$ as major constituents. Hence, while the present crystals may be prepared from inexpensive raw materials as may be the garnets, the extreme hardness and brilliance of my crystals permit their use as heavy-duty abrasives and as decorative stones of gem quality.

As indicated above, the molecular ratio of the ingredients which comprise my present novel gemstones is 0.893 mole of XO, 0.083 mole of $M_2O_3$, and 1.100 moles of $ZO_2$. This ratio of the essential components of my composition is critical and the initial materials used to prepare my composition must be carefully measured to prepare a mixture which will yield, upon fluxing, the above ratio of XO, $M_2O_3$ and $ZO_2$. Upon analysis of my present stones, it is found that the above ratio of XO, $M_2O_3$ and $ZO_2$ is consistently found and believed to be unique in this type of crystalline material.

The hardness of the present crystalline structure is about 8.5 on the Mohs scale. This is considerably greater than the hardness found in natural and synthetic garnet which ranges from about 5 to 7 on the Mohs scale. Hence, it is found that the present crystalline materials find utility as abrasives for numerous polishing and cutting operations.

The index of refraction of the present novel crystals is on the order of 1.9. This index of refraction indicates a crystalline material having an extreme brilliance when cut and polished in the conventional manner.

It is also found that by varying the metals, represented by X, M and Z above, interesting and diverse electromagnetic properties may be obtained in the novel crystals herein described.

The process by which the present stones are prepared consists essentially of melting and subsequently cooling a mixture of compounds which will yield the above-indicated ratio of XO, $M_2O_3$ and $ZO_2$. As indicated above, the ratio in which components of the present crystals are combined is extremely critical and the components should be carefully weighed to an accuracy of about $1/100\%$.

The essential ingredients of the crystalline material comprises XO, $M_2O_3$ and $ZO_2$ which are oxides. In addition to these oxides, equivalents thereof may be used in forming initial composition which is subsequently melted and solidified. For example, in lieu of calcium oxide (CaO), which is used in one preferred embodiment, calcium carbonate ($CaCO_3$) in the appropriate equivalent amount thereto may be used. Similarly, chemical equivalents to $SiO_2$ and $Al_2O_3$ and hydrates thereof may be equally adapted for use in the present invention provided allowance is made for the weight of decomposable material such as carbon dioxide or water, which is removed during the fusing or fluxing operation.

The admixture of XO, $M_2O_3$ and $ZO_2$ (or equivalents thereto) is heated to a temperature in excess of the melting point thereof. In general, this will require a temperature ranging of from about 1100 to 1200° C. The melt is maintained at that temperature until any decomposable components, if present, are removed and the desired stable ratio of XO, $M_2O_3$ and $ZO_2$ is obtained. The melting operation may take place in any conventional high-temperature apparatus, such as a silicon crucible heated with an electric arc or appropriate flame-type device.

The manner in which the melt is cooled will depend on the type and size crystals desired. For example, when it is desired to obtain extremely small crystals, which are suitable for use in abrasive compounds, an extremely rapid cooling rate is desired. On the other hand, when it is desired to obtain relatively large crystals (on the order of 5 to 50 carats in weight), a slow cooling rate is desirable. This slow cooling takes place by placing the admixture in a heated furnace device which is permitted to cool at a slow rate, usually on the order of less than about 100° per hour. This slow cooling rate will permit the formation of large gem quality crystals. The yield of crystals obtained varies somewhat upon the specific technique used in cooling, but ordinarily, ranges on the order of 85–100% of starting materials.

As indicated above, the present novel crystalline structures find use in abrasive compositions due to their extreme hardness and relative inexpensive price. Furthermore, the present crystals may be prepared in gem quality, which, when polished in the conventional manner, yield gem-like stones having extreme brilliance and clarity.

Having described the basic aspects of my present invention, the following examples are given to illustrate specific embodiments thereof:

Example I

The following ingredients were weighed on an analytical balance to an accuracy of 0.001 gram:

| | Grams |
|---|---|
| $Al_2O_3$ (aluminum oxide) | 0.8250 |
| $CaCO_3$ (calcium carbonate) | 8.93 |
| $SiO_2 \cdot H_2O$ (silicon dioxide monohydrate) | 8.300 |

The above materials were admixed in a silica crucible and melted in an electric arc furnace at a temperature of 1100 to 1200° C. The molten material was then removed from the furnace and permitted to cool rapidly at room temperature. The crystallization proceeded rapidly and smoothly and a multitude of small crystal-clear crystals having a hardness of 8.5 Mohs and an index refraction of 1.9 were formed. A yield of about 85% was obtained.

Example II

The weights of aluminum oxide, calcium carbonate and silicon dioxide indicated above were placed in a silica crucible and melted with an oxygen rock gas torch. The clear melt was then permitted to cool slowly in a firebrick furnace. The result was the formation of a series of large, clear crystals having a weight of up to 50 carats. These crystals were cut and polished using conventional gem-cutting techniques to prepare gem quality stones having an extremely high degree of brilliance.

The above examples clearly indicate that by use of the technique described herein, useful and novel synthetic gem-like crystals may be readily and economically prepared.

What is claimed is:

1. A method for preparing synthetic crystals of gem-like quality which consists essentially of the following ratio of XO, $M_2O_3$ and $ZO_2$:

| | Moles |
|---|---|
| XO | 0.893 |
| $M_2O_3$ | 0.083 |
| $ZO_2$ | 1.100 | wherein X is selected from the group consisting of calcium, beryllium, and barium; M is selected from the group consisting of aluminum, chromium, iron, manganese, nickel, rare earth metals with atomic number from 58 to 71 and mixture thereof; and Z is selected from the group consisting of silicon, titanium and germanium, which comprises heating a mixture of XO, $M_2O_3$ and $ZO_2$ in the ratios defined above to a temperature in excess of the melting point thereof, and cooling the molten mixture at a rate of less than 100° C., per hour to obtain solid crystals of useful gem size.

2. The method of claim 1, wherein the melting temperature is between 1100 to 1200° C.

3. The process of claim 1, wherein X is calcium, M is aluminum, and Z is silicon.

4. A synthetic crystal which consists of CaO, $Al_2O_3$, and $SiO_2$ in the molecular ratio of 0.893, 0.083, and 1.100 respectively.

References Cited

UNITED STATES PATENTS 2,457,054  12/1948  Leverenz _____ 252—301.6
2,723,915  11/1955  Merker _____ 106—42

TOBIAS E. LEVOW, Primary Examiner.
ROBERT EDMONDS, Assistant Examiner.

U.S. Cl. X.R.

51—308